US006214450B1

(12) United States Patent
Wickert et al.

(10) Patent No.: US 6,214,450 B1
(45) Date of Patent: Apr. 10, 2001

(54) HIGH SOLIDS WATER-BORNE SURFACE COATING CONTAINING HOLLOW PARTICULATES

(75) Inventors: Frank A. Wickert, Olmsted Township; Donald C. Portfolio, Solon; Steven J. Conway, Cleveland Hts.; Gregory P. Bidinger, Akron; Stephen R. Peters, Jr., Mentor, all of OH (US)

(73) Assignee: Tremco Incorporated, Beachwood, OH (US)

( * ) Notice: Subject to any disclaimer, the term of this patent is extended or adjusted under 35 U.S.C. 154(b) by 0 days.

(21) Appl. No.: 09/030,715

(22) Filed: Feb. 25, 1998

(51) Int. Cl.[7] ............................... B32B 7/02; B32B 5/16; B32B 27/00; B32B 3/00; C08L 31/00

(52) U.S. Cl. .................... 428/220; 428/323; 428/327; 428/332; 428/500; 428/924; 428/926; 524/832

(58) Field of Search ................... 428/480, 500, 428/323, 327, 411.1, 908.8, 923, 924, 926, 220, 332; 524/813, 832, 834

(56) References Cited

U.S. PATENT DOCUMENTS

| 3,980,602 | * | 9/1976 | Jakubauskas | 260/29.6 TA |
|---|---|---|---|---|
| 4,069,186 | * | 1/1978 | Ramig | 260/29.6 |
| 4,089,828 | * | 5/1978 | Vasishth et al. | 260/29.6 |
| 4,256,804 | * | 3/1981 | Jasperson | 428/332 |
| 4,390,570 | * | 6/1983 | Rehberg | 427/385.5 |
| 4,746,565 | * | 5/1988 | Bafford et al. | 428/251 |
| 4,749,731 | * | 6/1988 | Kyminas et al. | 524/31 |
| 4,859,723 | * | 8/1989 | Kyminas et al. | 524/31 |
| 4,972,000 | * | 11/1990 | Kawashima et al. | 521/54 |
| 5,409,527 | * | 4/1995 | Baker et al. | 106/2 |
| 5,541,253 | * | 7/1996 | Dunaway et al. | 524/832 |
| 5,626,945 | * | 5/1997 | Berzins et al. | 428/174 |
| 5,648,427 | * | 7/1997 | Fujita et al. | 525/104 |
| 5,681,880 | * | 10/1997 | Desor et al. | 524/320 |
| 5,736,466 | * | 4/1998 | Wierer et al. | 442/67 |
| 5,744,544 | * | 4/1998 | Dunaway et al. | 524/832 |
| 5,874,148 | * | 2/1999 | Hough et al. | 428/95 |

OTHER PUBLICATIONS

"The Use of Zirconium in Surface Coatings", Dr. Peter J. Moles, Application Information Sheet 117, Magnesium Elekton, Inc.*
"Formulating Stable Latex Paints with Zinc Oxide", Mattei et al., Journal of Coating Technology, vol. 63, No. 803, Dec. 1991.*
"Value–adding syntactic foams gain in composites applications" by Young, *Modern Plastics Apr., 1995,* pp. 92–96.
"Elastomeric Syntactic Foams for Stress Relief of Electronic Components" by Rand, *Saf. Perform . Energy Conserv. Proc. S.P.I. Annu. Tech. Conf.,* 23rd, 1977 (Pub. 1978), pp. 61–64. (Please note: The year of publication is sufficiently earlier than the filing date so that the month of the year is not at issue.)

"Microspheres" by Plummer. *Encyclopedia of polymer science and engineering,* 2nd er., 1988, pp. 788–795.
"Reduce Part Weight and Cost Wsith Hollow Microsperes for Plastics" by Barber, *Plastics Design & Processing,* Jul., 1978, p. 44–48.
"Ocean Engineering and the Environment" by Pasco–Anderson, Watkins, Marine Technology Spciety, Conference Record 2nd vol., Nov., 1985, p. 1253–1259.
"Syntactic Carbon Foams", by Thomas, *Materials Science and Engineering vol. 12,* 1973, pp. 219–233 (Please note: The year of publication is sufficiently earlier than the filing date so that month of the year is n an issue.)
"Syntactic Polymer Foams", by Shutov, *Adv. Polym. Sci.,* 1986, pp. 63–123. (Please note: The year of publication is sufficiently earlier than the filing date so that the month of the year is not an issue.)
"Free Volume" by Hare, *Journal of Protective Coatings and Linings,* Jan., 1996, pp. 67–78.
"Ultra High Solids Copolymer Emulsion for Demanding Applications" by Hausman, Horwat and Lenney, *Adhesives Age,* Oct., 1995, pp. 49–60.
"TremLastic: A High–Performance Rubberized Emulsion for Protecting", Tremco Data Sheet R–751703A, Sept. 1992.
"Polarcote FR: A Highly Reflective, Fire Retardant, Elastomeric Roof Coating", Tremco Data Sheet.
"Product Name: "TI–Pure" Rutile R902", Dupont Data Sheet, Apr. 14, 1997.
"Kadox–930 Zinx Oxide", Zinx Corporation of America Data Sheet.
"Igepal CTA–639W"*Technical Bulletin: Coatings, Inks, Adhesives and Construction Technology,* Rhone–Poulenc.
"DREWPLUS L–475 Foam Control Agent", 1988 Ashland Chemical, Inc. Data Sheet. (Please note: The year of publication is sufficiently earlier than the filing date so that month of the year is not an issue.)
"Xama® –2" EIT, Inc. Material Safety Data Sheet, May 16, 1994.
"Xama® –7" EIT, Inc. Material Safety Data Sheet, Apr. 2, 1993.
"BYK–156: Polymeric Dispersant", BYK–Chemie USA Data Sheet.

(List continued on next page.)

*Primary Examiner*—Paul Thibodeau
*Assistant Examiner*—Sheeba Ahmed
(74) *Attorney, Agent, or Firm*—Calfee, Halter & Griswold, LLP

(57) ABSTRACT

A high solids, water-borne coating comprises a latex polymer, non-film-forming particulates and water. The high solids coating contains up to 90% solids (non-volatiles/volume) and pigment volume concentration (PVC) that can range between about 5% to 95%. The thick-coverage surface coating herein dries at a fast rate, provides excellent through-dry properties as measured by tensile, elongation, and water resistance, and can replace traditional coatings used in multi-coat processes. The coating herein can contain up to about 40% hollow microspheres to yield a dried coating that has up to about 57% PVC and be used as a roof coating that meets a required elongation of at least 200%.

46 Claims, No Drawings

OTHER PUBLICATIONS

"Fast Drying High Solids Latices" by Buckman and Bakker, *European Coatings Journal,* pp. 922–92 Dec., 1995.

"How do coating actually dry?" by Athey, *European Coatings Journal,* pp.259–261, Sep. 1995.

"Formulating Stable Latex Paints with Zinc Oxide" by Mattei, et al., *Journal of Coatings Technology,* vol. 63, No. 803, Dec. 1991, pp. 39–45.

"Development of cohesive strength in polymer films from latices: effect of polymer chain interdiffusion and crosslinking" by Daniels and Klien, *Progress in Coatings,* vol, 19, 1991, pp. 359–378. (Please note: The year of publication is sufficiently earlier than the filing date so that month of the year is not an issue.)

"Zirconium–based coupling agents and adhesion promoters" by Moles, *J. Adhesion Sci. Technol.,* vol. 6, No. 1, 1992, pp. 61–71. (Please note: The year of publication is sufficiently earlier than the filing date so that month of the year is not an issue.)

"Aromatic Polycarbodiimides: A New Class of Crosslinkers for Water–borne Coatings" by Brown, *Surface Coatings International,* 1995, pp. 238–242. (Please note: The year of publication is sufficiently earlier than the filing date so that month of the year is not an issue.)

"Rethinking Polyfunctional Aziridines" by DeLaney, *Paint & Coatings Industry,* Mar., 1996, pp. 46–47.

Technical Bulletin: "Polymer Products for Adhesives" by Horwat, Hausman and Lenney, Air Products Corp.

Technical Bulletin: "General Guidelines for Dispersant Use", Rohm and Hass Company, Jun. 1994.

"High Build Refelective Roof Coating: A Highly Reflective, Heavy Build, Elastomeric Roof Coating", Tremco Data Sheet ROO–251, Rev. Aug. 1996.

"Haloflex 563" and Formulating Information, Zeneca Resins Data Sheet Bulletin HA–563, Rev. Feb. 1993.

"Bacote™20", Data Sheet 722, Nov. 12, 1996.

"The Use of Zirconium Compounds in The Adhesive Indsutry", Sheet 116A, Application Information, Nov. 22, 1995.

"Interfibe Technical Bulletin", Rohm and Hass Company, Sep. 28, 1992.

"Interfibe 5FT", Technical Data Sheet, Interfibe Corporation.

"The Use of Zirconium in Surface Coatings", by Moles, Technical Data Sheet, Sheet 117, Application Information.

"Polyfunctional Aziridines", EIT, Inc., Technical Data Sheet.

"Ucarlnk® Crosslinkers XL–29SE and XL29–MP", UCAR Coatings Resins Application Information, Technical Data Sheet F–60812, Aug. 1991–2M.

"EC Technology for Elastomeric Roof Coatings", Rohm and Hass Company, 83E60, 1989.

"Dualite Technical Data Package", Pierce & Stevens Corp., Mar. 1994.

"Laponite RD", Southern Clay Products, Inc., Product Bulletin.

"Nuosept 95 Preservative, Preservative for Aqueous Products, EPA Registration No.: 1100–82", Huls America, Inc.

"Nuocide, 404–D, Fungicide for Mildew Control on Paint Film, EPA Registration No.: 50534–115–1100", Huls America, Inc.

"Automated Handling of Low Density Syntactic Compounds" by Larsen, *30th National SAMPE Symposium,* Mar., 1985, pp. 595–605.

Technical Data Sheet regarding Aziridene's, EIT, Inc., May 16, 1994.

* cited by examiner

HIGH SOLIDS WATER-BORNE SURFACE COATING CONTAINING HOLLOW PARTICULATES

FIELD OF INVENTION

The field of this invention pertains to a high solids surface coating and a method of making the coating. In particular, this invention relates to a high solids, water-borne coating comprising latex polymer and non-film-forming particulates which are hollow, and preferably microspheric in shape. In another embodiment, the surface coating contains cross-linker, flame retardant, and opacifier ingredients for use as a roof coating.

BACKGROUND

Government regulations have driven the replacement of coatings having volatile organic content (VOC) with water-borne coatings. However, water-borne coatings are much slower to dry, and in some cases they must be applied sparingly to achieve reasonable dry rates and to avoid excessive shrinkage. Conventional water-borne coatings typically require the application of several layers of coating and results in high labor cost and high overall cost of their use.

Generally, the higher the solids content by volume of liquid coating, the faster it dries resulting in a thicker, dried coating. The solids content of a liquid coating as a measure of volume is commonly referred to as the volume-non-volatile (NV/volume). To increase the drying rate as well as the coverage of a water-borne coating, it is a common practice to increase the proportion of non-film-forming solids by adding fillers such as kaolin clays or calcium carbonate. The percent of non-film-forming ingredients present in a coating, once dried, is generally known in the coatings industry as the pigment-volume-concentration (PVC). PVC is limited to ensure encapsulation of the non-film-forming ingredients by the latex polymer. If encapsulation becomes incomplete, the result is porosity in a dried coating that has diminished physical properties. In such a case, the dried coating is said to have exceeded the critical pigment-volume-concentration (CPVC). There is also a practical limitation in the amount of total solids that can be added to a water-borne coating since processing considerations such as manufacturing, application equipment and application rates are limited by the high viscosity and shelf life stability of the liquid coating.

High solids, water-borne coatings are desirable for many end-uses, and in particular roof coatings, where dried film thickness (DFT) requirements are higher than normal and application of multiple coats is necessary for reasonable dry rates and high coverage. Elastomeric properties, in roof coatings for example, are particularly important to withstand the stresses and strains associated with slow drying on a non-porous substrate such as a roof. Elastomeric properties are important to prevent excessive shrinkage and specifically, cracking and lifting of the coating away from the substrate as the water evaporates. The dried coating must have satisfactory elongation, usually at least 200% elongation to withstand substrate movement caused by the wide temperature range which is characteristic of roofing environments. A conventional water-borne, reflective top coat typically has about 50% solids (NV/Volume). Since top coatings are formulated to produce an "elastomeric" dried coating that has a minimum elongation of about 200%, the volume of non-film-forming ingredients in the dried coating is less than about 50% (less than about 50% PVC).

Conventional water-borne coatings are commonly applied as a reflective top coating for old and new roofing systems. For example, built-up and modified bitumen roofing systems typically require the application of a black asphalt base coat followed by at least two coats of reflective, and in some cases, fire resistant top coat. Suitable coverage by a roof coating system typically requires the application of a 50% NV/vol. asphalt base coat (applied at about 5.0 gallon per square and 40 dry mils thickness), followed by the application of two or more coats of 50% NV/vol. reflective, water-borne top coat (applied at approximately 1.0 to about 1.5 gallon per square and 8 to 12 dry mils thickness). The asphalt base coating requires a 30-day drying period before it can be top coated with the first coat of water-borne, reflective topcoat. A second coat of the water-borne topcoat is typically applied after 24 hours to complete the dried coating total thickness requirements of about 48–52 dry mils for the application. This lengthy application process is sometimes cause for further delay between coats because the incidence of ponded water can slow the drying of these multiple coat systems significantly.

There is a need to develop a water-borne surface coating that dries at a faster rate and yields an improved coverage rate. Also, there is a need to develop a surface coating that dries at a faster rate yet maintains or improves the elongation properties of conventional coatings. For practical purposes, the viscosity of the liquid coating must be within a range such that the coating can be applied with standard airless spray, brush or roller equipment.

SUMMARY OF THE INVENTION

The present invention provides a high solids, surface coating that has a greater coverage rate, an improved drying rate, and a dried coating that has the same or improved elongation properties versus conventional coatings.

The high solids surface coating of the invention herein comprises latex polymer, hollow particulates and water. The hollow particulates are preferably hollow microspheric particulates. The coating comprises by volume preferably from about 2% to about 76%, more preferably from about 26% to about 45%, and most preferably from about 30% to about 36% of latex polymer. The coating also contains by volume, preferably from about 2% to about 76%, more preferably from about 26% to about 45%, even more preferably about 34% to about 45%, and most preferably from about 34% to about 40% of hollow particulates; and preferably, from about 20% to about 60% water by volume. The coating preferably includes a suspending agent preferably at about 0.03% to about 10%, more preferably about 0.1% to about 2% and most preferably about 0.15% to about 0.3% by volume; end-capping crosslinker preferably about 0.1% to about 10%, more preferably about 0.5% to about 5%, and most preferably about 0.7% to about 1% by volume; and ionic crosslinker at preferably about 0.1% to about 2%, more preferably about 0.2% to about 0.8%, and most preferably about 0.2% to about 0.4% by volume.

The high solids surface coating herein comprises by volume preferably from about 40% to about 90%, more preferably from about 40% to about 80% by volume, even more preferably about 65% to about 75% by volume, and most preferably about 68% to about 72% by volume. Conventional coatings having a high percentage of solids by volume have been made, however, what differentiates the high-solids surface coating of this invention from conventional coatings, is that a higher percentage of solids is comprised of non-film-forming ingredients. At a given solids concentration (NV/vol.), the surface coating herein produces a dried coating that has a higher concentration of non-film-forming ingredients, that is a higher PVC, and yet has equal or improved elastomeric properties.

When used as a roof coating, the coating herein can be generously applied to a non-porous roof substrate at between about 3 to 6 gallons per square. The coating dries up to about 72 dry mils thick and is greater than or equal to the thickness of a conventional roof coating system that requires a three-step application. Also, conventional "elastic" top coats typically contain less than about 50% non-film-forming ingredients to produce a dried coating that meets the required tensile elongation of at least about 200%. The coating of this invention when applied to a roof can yield a dried coating that contains up to about 57% non-film-forming ingredients and has a tensile elongation of at least about 200%.

The invention also relates to a water-resistant coating comprising latex polymer solids, ammonium zirconium carbonate, and water. The water-resistant coating comprises by volume from about 40% to about 95% latex polymer solids and from about 0.05% to about 20% ammonium zirconium carbonate. A water-resistant coating that contains ammonium zirconium carbonate has improved water resistance during the early stages of drying.

This invention also relates to an adhesive promoting primer coating comprising latex polymer solids, antimony trioxide, and water. The adhesive-promoting primer coating comprises from about 40% to about 95% by volume latex polymer solids and from about 0.1% to about 25% by weight antimony trioxide. An adhesive-promoting primer coating that contains antimony trioxide which, in addition to improved fire resistance properties, has improved adhesion particularly to silatious substrates, which consist of primarily silica mineral.

This invention also relates to a high tensile strength coating comprising latex polymer solids, zinc oxide and water The high tensile strength coating comprises from about 40% to about 95% by volume latex polymer solids and from about 0.1% to about 20% by weight zinc oxide. The high tensile strength coating herein, that contains zinc oxide, has improved tensile strength properties. This technology is also useful for caulks and sealant applications.

DETAILED DESCRIPTION OF THE INVENTION

High Solids Surface Coating

The high solids surface coating herein comprises latex polymer, hollow particulates and water. A suspending agent is preferably included to help ensure homogeneity of the non-film-forming ingredients throughout the liquid coating. Also, fiber may be added for Theological control especially if the coating is applied on pitched surfaces. If the surface coating is used as a roof coating, for example, the coating preferably contains flame-retardant, end-capping crosslinker, ionic crosslinker and opacifier. The coating preferably includes surfactants such as wetting agents, dispersants and defoamers. Additional optional ingredients include fungicide (mildewcide) and preservative (biocide). The addition of propylene glycol maintains freeze/thaw stability of the liquid coating.

The high solids surface coating herein comprises by volume preferably from about 40% to about 90%, more preferably from about 40% to about 80% by volume, even more preferably about 65% to about 75% by volume, and most preferably about 68% to about 72% by volume solids. The high solids surface coating comprises by volume preferably about 2% to about 76%, more preferably about 26% to about 45%, and most preferably about 30% to about 36% latex polymer. The surface coating also contains by volume preferably from about 2% to about 76%, more preferably from about 26% to about 45%, even more preferably about 34% to about 45%, and most preferably from about 34% to about 40% of hollow particulates, and preferably hollow microspheric particulates. A third necessary component of the surface coating is from about 20% to about 60% water by volume.

The high solids surface coating optionally includes by volume: preferably about 0.03% to about 10%, more preferably about 0.1% to about 2%, and most preferably about 0.15% to about 0.3% of suspending agent; preferably about 0.1% to about 10%, more preferably about 0.5% to about 5%, and most preferably about 0.7% to about 1% end-capping crosslinker; preferably about 0.1% to about 2%, more preferably about 0.2% to about 0.8%, and most preferably about 0.2% to about 0.4% ionic crosslinker; and preferably about 0.1% to about 5%, more preferably about 0.5% to about 1.5%, and most preferably about 0.5% to about 1% fiber.

Surfactants are preferably used in making the coating and include by volume: preferably about 0.05% to about 3%, more preferably about 0.1 % to about 0.5% and most preferably about 0.2% to about 0.3% wetting agent; preferably about 0.05% to about 3%, more preferably about 0.2% to about 0.6%, and most preferably about 0.3% to about 0.5% dispersant; and preferably about 0.1% to about 3%, more preferably about 0.5% to about 1%, and most preferably 0.8% to about 0.9% defoamer. The high solids surface coating optionally includes, by volume, about 0.1% to about 10% by volume propylene glycol, about 0.1% to about 2% by volume fungicide, about 0.05% to about 1% biocide,and about 0.1% to about 10% opacifier.

The high solids surface coating of this invention has a total solids content, also referred to as the volume percent of non-volatiles (NV/vol.), that can range between about 40% to about 90%. Upon evaporation of water, the latex polymer solids come together to form into a continuous matrix via coalescence while entrapping the uniformly dispersed non-film-forming ingredients of the coating therein. Accordingly, the non-film-forming ingredients make up a discrete phase that is encapsulated by the continuous binder matrix of the dried coating. The pigment volume concentration (PVC) is herein defined as the percentage of non-film-forming ingredients relative to total solids, on a dry volume basis. The high solids surface coating herein, when dried, can produce a dried coating that has preferably from about 5% to about 95% PVC, more preferably from about 40% to about 60% PVC, and most preferably from about 50% to about 55% PVC. Non-film-forming ingredients are known in the art, generally as pigments, fillers or extenders, and are discrete particles that are incapable of forming a film. Non-film-forming ingredients of the invention herein include for example hollow particulates, suspending agents, opacifiers, crosslinkers, fibers, and fungicide, however other nonsolvent ingredients which are unable to coalesce at a temperature range between about −40° F. to 40° F. may be included. An exemplary list of non-film forming ingredients, which are optional are clay, mica, calcium carbonate, silica and talc.

The invention herein provides a high solids surface coating that has a greater coverage rate, an improved drying rate, and also yields a dried coating that has the same or improved elongation properties at a given PVC than conventional coatings. Given the high solids content, the surface coating of this invention is advantageously thixotropic, and thus exhibits low viscosity when processed at high shear rates and exhibits high viscosity once it is applied to a surface. The viscosity of the coating preferably ranges from about 95 KU to about 115 KU at 25° C. as measured by a Stormer Viscometer. This viscosity range enables conventional processing methods and equipment such as airless spray, roller or brush.

The high solids surface coating developed herein when applied to a roof, not only dries at a faster rate than conventional water-borne roof coatings, but can be used as a one-step, reflective coating to eliminate the need for a multi-coat system that consists of an asphalt dispersion base-coat and a reflective, fire retardant top coat. The single-coat system is preferably applied from about 3.0 to about 6.0 gallons per square to produce a dried film thickness of about 35 to about 70 mils. Under less desirable drying conditions, for example about 10° C. and about 80% relative humidity, the high solids surface coating which can be applied to a nonporous substrate at a wet thickness of about 80 mils, is rain resistant within approximately 8 hours. The coating when thoroughly dried, has a thickness of approximately 50–60 mils, and provides a smooth surface to a substrate thereby, for example, concealing the lap lines on built-up roofing systems.

The high-solids coating of this invention, once dried, contains up to about 57% non-film-forming ingredients (57% PVC) yet has reversible elongation of at least about 200% and cold temperature flexibility at −40° C. as tested according to cylindrical mandrel test method ASTM D-522.

Latex Polymer

The high solids surface coating described herein comprises a latex polymer preferably present in the form of a latex dispersion. Preferably, a suitable latex dispersion has bi-modal or multi-modal particle size distributions. Latex dispersions that have multi-modal particle size distributions and that are greater than 70% solids by weight, are made with a latex having 40–68% by weight solids that is used as the medium for further polymerization by the addition of monomers. The technology to create high solids latex dispersions is disclosed in U.S. Pat. No. 5,541,253 and is hereby incorporated by reference herein.

The latex dispersion may be derived from a wide variety of polymers and co-polymers and combinations thereof. Preferably, a latex dispersion used to make the high solids surface coating herein, is derived from polymers which behave as an elastomer preferably an elastomer within the temperature range from about −23° C. to about 80° C. Preferred latex dispersions are those derived from vinyl acetates or one or more alkyl acrylates having 4–16, or preferably, 4–12 carbon atoms. An exemplary list of other polymeric dispersions suitable for the high solids, surface coating of this invention include polymers or co-polymers derived from acrylate, vinyl acetate, methacrylates, isoprene, butadiene, styrene, alkylated styrene, ethylene and/or dibutyl maleate. Other polymer dispersions may be used, however, the elongation properties of a given high solids surface coating may limit the application.

For outdoor applications such as a roof coating, for example, the latex dispersion is preferably derived from acrylate monomers that possess excellent weatherability characteristics. One such latex dispersion contains ethylacrylate and butylacrylate polymers and is available as XPD2600 from the BF Goodrich Company. The XPD2600 acrylic latex dispersion is derived from an ethylacrylate and butylacrylate latex that is further polymerized by the addition of ethylacrylate and butylacrylate monomers. The XPD2600 product contains at least about 80% solids by volume and has a particle-size distribution with two or more modes. Preferably, less than 20% of the particles by weight have a diameter of less than 0.5 microns, approximately 67.2% of the polymer particles have a diameter ranging from about 0.5 to about 4 microns, and approximately 13.2% of the polymer particles have a diameter greater than 4 microns.

Another copolymer suitable for the invention herein includes polyvinyl acetate-ethylene copolymer. A latex dispersion of polyvinyl acetate-ethylene copolymer (73% by weight copolymer) is commercially available as Airflex® 7200 from Air Products and Chemical Inc.

Hollow Particulates

The non-film-forming ingredients of the surface coating herein comprise hollow micron-sized particles, which are preferably microspheres. Compared to conventional coatings, a surface coating containing hollow particulates provides increased coverage and an improved dry rate. It is believed that the hollow particulates of the liquid surface coating once applied to a substrate, create fissures during drying, and thus, facilitate an increased dry rate per unit thickness of coating. For example, the typical hollow microspheres have a diameter up to 200 microns, with a mean diameter that ranges preferably 20–60 microns, and most preferably 30–50 microns. The size of the hollow particulates is not critical, however, the diameter of the particulates has bearing on the surface profile of the dried coating. In roof coatings, for example, it is preferred that the hollow microspheres have a mean diameter of about 40 microns to ensure a smooth surface profile. In roof topcoats, for example, a smooth surface profile is desirable to minimize the buildup of dirt and soot. Hollow microspheres are isotropic and, thus, their properties are distributed uniformly over their spherical shape. The internal stresses during cure can be distributed evenly, thereby reducing the tendency toward mud cracking. When mechanical stress is uniformly distributed during cure, the tensile strength, the impact strength and the overall flexibility of the dried coating is improved.

The hollow microspheric particulates of the high solids surface coating herein are preferably made of polyvinylidene chloride (PVDC), however, several other materials may be used. In roof coatings, for example, the high solids surface coating preferably contains hollow microspheres made of polyvinylidene chloride to yield a dried coating which is spongy and elastomeric. In addition, the polyvinylidene chloride microspheres have good resistance properties over a wide temperature range of about −40° C. to about 80° C. Hollow microspheres made of PVDC are commercially available as Dualite® M6001AE from the Pierce & Stevens Corporation. The surface coating herein may contain hollow particulates made of several other materials. An exemplary list of such materials include carbon, graphite, zinc, glass, ceramic, phenolic, and other plastics such as acrylics, polyvinyl chloride, and polystyrene.

Suspending Agent

A suspending agent is preferably added during the manufacture of the high-solids, surface coating. The suspending agent should form highly thixotropic, heat stable gels that prevent non-film-forming ingredients, particularly hollow particulates, from floating to the surface of the liquid coating. The preferred thickener is colloidal clay available in the form of a free-flowing white powder under the trademark Laponite® RDS from the Southern Clay Products, Inc. The Laponite® is 59.5% by weight silica and 27.5% by weight magnesium oxide. Other suitable suspending agents include Aquamont® 600 supplied by Southern Clay Products, Inc. and Polyphobe® 106HE from Union Carbide Corp. The Polyphobe® 106HE requires activation by an amine such as Amp 95 from Angus Chemical.

End-capping Crosslinker

The high solids surface coating herein preferably contains end-capping crosslinker and achieves improved water resistance during the early stages of drying. The use of an end-capping crosslinker, such as ammonium zirconium carbonate (AZC) for example, improves water resistance as well as dirt resistance. AZC is commercially available from Magnesium Elektron, Inc. under the trademark Bacote® 20. Other examples of crosslinkers that can be used in the high solids surface coating of this invention include zinc ammonia complex, aziridene and carbodiamide crosslinker.

Ionic Crosslinker

The high solids surface coating preferably contains latex polymer, hollow particulates that are preferably hollow microspheres, water and ionic crosslinker, preferably zinc oxide. Zinc oxide improves the tensile strength of the coating.

Also, when the high solids surface coating herein includes a fungicide, the zinc oxide and the fungicide perform synergistically to give the applied coating a high level of mildew resistance. Zinc oxide is commercially available as Kadox-930 from Zinc Corporation of America.

Fibers

Preferably, fiber is added to improve cohesion and flow characteristics of the surface coating. Cellulose fiber is preferred as the hydroxl groups of the cellulose fiber are readily available to form hydrogen bonds with latex polymer present in a dispersion. The fibers help to prevent the liquid surface coating from sagging on pitched substrates during drying. Modified cellulose fibers are available from Interfibe Corporation of Solon, Ohio, under the tradename Interfibe® 5FT. These fibers have an average length of 0.5 to 2 millimeters, an average fiber diameter of 10 to 20 microns and a density of 4.62 lbs./cu.ft. Short fibers made of polyethylene may be used as well. An example of short fibers is commercially available as SHORT STUFF Polyethylene® made by MiniFibers, Inc.

Surfactants

Polymeric dispersants, foam control agents, wetting agents, and Theological additives, otherwise known as surfactants (surface controlling agents), are preferably added to the liquid polymer system in order to facilitate processing.

A suitable polymer dispersant is an anionic ammonium salt of polyacrylic acid, and is commercially available under the trademark BYK® 156 from BYK-Chemie U.S.A. The polymeric dispersant is effective in dispersing particulates including conventional opacifiers or colorant pigments.

It is preferred that a foam control agent is added to the liquid polymer system to minimize the foaming action during the manufacture of the coating. A suitable foam control agent is a non-ionic, anti-foam formulation comprised of a blend of mineral oils and silica derivatives. This is commercially available under the trademark Drewplus® L-475 from Drew Industrial Division of Ashland Chemical, Inc.

A wetting agent greatly improves wetting, by lowering the surface tension, of hard-to-disperse solids. Wetting agent also allows a coating to spread on hard to wet surfaces, such as a roof. A suitable wetting agent is a water-soluble, non-ionic alkylphenol ethoxylate and is commercially available under the trademark Igepal® CTA-639W from Rhone-Poulenc.

Opacifier

The hollow microspheric particulates of this invention discussed above, greatly increase the opacity of the overall surface coating. However, the high solids surface coating of this invention preferably contains opacifier when the surface coating is used as a roof coating, for example. Specifically, opacifiers deflect light and heat away from the roof and protect the binder system and substrate from the damaging effect of ultraviolet radiation.

Titanium dioxide such as "TI-Pure" Rutile R902 of the DuPont de Nemours Company is a preferred white powder opacifier. An exemplary list of suitable reflective pigments include rutile and anatase titanium dioxide, lithopone, zinc sulfide, lead titanate, antimony oxide, zirconium oxide, titanium calcium, white lead, barium sulfate, zinc oxide, leaded zinc oxide, mixtures of the same and like opacifiers. The opacifiers preferably have a weight average particle size between about 0.3 to 0.5 microns.

Flame Retardants

Preferably, a flame retardant is employed to provide a coating that satisfies the Class A rating requirement of a roofing system. Suitable flame retardants include, for example, chlorinated vinyl acrylic copolymer latex such as Haloflex® 563 from Zenica Resins of Wimington, Mass., or antimony trioxide such as Octoguard® FR-10 from Tiarco Chemical.

The vinyl acrylic copolymer latex, a preferably halogenated flame retardant, is the preferred flame retardant when the high solids surface coating of this invention is applied to a roof. When heated, the high solids surface coating containing flame retardant, forms a non-burnable crust that protects ignitable roofing materials beneath it. The Haloflex® 563 latex contains approximately 42% NV/vol. (49–51% solids by weight), approximately 44% by weight chlorine and has −13° C. Tg.

The high solids surface coating herein, containing antimony trioxide flame retardant, not only retards flames, but surprisingly improves adhesion of the coating to silatious substrates. The antimony trioxide flame retardant significantly improves wet and dry adhesion to silatious substrates, however, the mechanism for this improved adhesion is not fully understood. An exemplary list of suitable flame retardants of the invention herein include aluminum trihydrate, melamine pyrophosphate, pentaloromodiphenyloxide, chloroparafin, barium metaborate, and ammonium polyphosphate.

Additional/Optional Ingredients

Preservatives and fungicides may be added to the liquid coating to prevent mildew, fungal growth, deterioration and spoilage during the manufacture, storage and exterior exposure of the surface coating herein. An aqueous preservative is optionally added to the liquid polymer system to prevent bacterial decomposition of the surface coating during manufacture and storage. The preservative can be a non-metallic, non-chlorinated organic compound designed for use in water-based products. A suitable preservative is Nuosept® 95 from the Huls America Inc. In addition, a microbicide is preferably added for the control of fungi. A fungicide provides effective prevention of mildew growth on the surface of a dried coating. A suitable fungicide is NuoCide® 404-D from Huls America Inc. NuoCide® 404-D is compatible with acrylic, vinyl acrylic or polyvinyl acetate based coating systems.

Water Resistant Coating

This invention relates to a water resistant coating comprising latex polymer, ammonium zirconium carbonate (AZC) and water. AZC has high reactivity with carboxylated polymers, such as acrylate polymers, at ambient conditions. The water resistant coating comprises by volume, preferably from about 40% to about 95% latex polymer solids, more preferably from about 60% to about 85% latex polymer solids, and most preferably from about 70% to about 85% polymer solids. The latex polymer is preferably an acrylate polymer. AZC is preferably added to latex polymer dispersion as a 20% aqueous dispersion. The water resistant coating herein comprises by volume preferably from about 0.05% to about 20%, more preferably about 0.1% to about 1.0%, and most preferably about 0.2% to about 3% ammonium zirconium carbonate. The AZC is commercially available from Magnesium Elektron, Inc. under the trademark Bacote® 20. Acrylate latex polymer is preferably present in the water resistant coating in the form of an acrylate latex dispersion and is commercially available as XPD 2600 from the B. F. Goodrich Company.

Adhesive-Promoting Primer Coating

This invention relates to an adhesive-promoting primer coating comprising latex polymer, antimony trioxide and water. The adhesive-promoting primer coating containing antimony trioxide has significantly improved wet and dry adhesion to substrates, including glass substrates for example. The mechanism for improved adhesion is not fully understood. The adhesive-promoting primer coating comprises by volume, preferably from about 40% to 95% latex polymer solids, more preferably from about 60% to about 85% latex polymer solids, and most preferably from about 70% to about 85% polymer solids. The latex polymer is preferably an acrylate polymer. The adhesive-promoting primer coating comprises by weight, preferably about 0.1% to about 25%, more preferably about 1.0% to about 20%, and most preferably about 15% to about 20% antimony trioxide. Antimony trioxide is commercially available as Octoguard® from Tiarco Chemical. Acrylate latex polymer is preferably present in the adhesive-promoting primer coating in the form of an acrylate latex dispersion and is commercially available as XPD 2600 from the B. F. Goodrich Company.

High Tensile Strength Coating

This invention relates to a high tensile strength coating comprising latex polymer solids, zinc oxide, and water. Zinc oxide reacts with the latex polymer and yields improved tensile properties. For example, when 10% zinc oxide by weight is added to a latex dispersion of 80% by weight acrylic polymer, the tensile strength is increased from about 77 psi to about 207 psi and the modulus at 100% elongation is increased from about 12 psi to about 78 psi.

The latex polymer dispersion comprises by volume, preferably from about 40% to about 95% latex polymer solids, more preferably from about 60% to about 85% latex polymer solids, and most preferably from about 70% to about 85% polymer solids. The latex polymer is preferably an acrylate polymer. The high tensile strength coating herein comprises by weight preferably about 0.1% to about 20%, more preferably about 0.5% to about 10%, and most preferably 1% to about 3% zinc oxide. Zinc Oxide is commercially available as Kadox®-930 from Zinc Corporation of America. Acrylate latex polymer is preferably present in the high tensile strength coating in the form of an acrylate latex dispersion and is commercially available as XPD2600 from the B.F. Goodrich Company.

In addition, storage stability can be achieved by preferably adding a dilute ammonium hydroxide solution to the high tensile coating. The high tensile strength coating herein preferably comprises up to about 10% by volume ammonium hydroxide.

Method Of Making High Solids Surface Coating

The thick-coverage surface coating is made in a disperser mill such as a Cowles disperser. The process of this disclosure is a two-stage batch process. Preferably, water, synthetic layered silicate, wetting agent, dispersant, defoamer, and pigments are first mixed together at high speed (5000 ft./min.) in the disperser mill (or alternatively, a sand mill, a pebble mill, a roller mill or a ball mill) to produce mixture 1. Second, mixture 1 is added to the polymeric latex dispersion and mixed at a low speed (4000 ft./min.). Finally, crosslinking agents are added followed by the addition of defoamers, hollow microspheres, flame-retardant, and preservative.

Construction Components With Applied Coating

Water-resistant and ultraviolet-resistant construction components may comprise the high solids surface coating, the water-resistant coating, the adhesion-promoting primer coating and the high strength coating of the invention herein. A water-resistant and ultraviolet-resistant construction component comprises a substrate and a dried, high solids surface coating disposed on the substrate; or a substrate and a dried water-repellent coating disposed on the substrate; or a substrate and a dried adhesive-promoting primer coating disposed on the substrate; a substrate and a dried high tensile strength coating disposed on the substrate, or a combination thereof.

The following Examples illustrate the merits of this invention. Particularly, formulations which yield from about 69% =to about 72% NV/vol. and from about 52% to about 54% PVC are shown in addition to the excellent physical, properties that can be achieved in a dried coating. The Examples provide methods of practicing the invention but should not be construed as limiting Ithe scope of this invention.

Working Examples

HIGH SOLIDS SURFACE COATING

EXAMPLE 1

A high solids surface coating containing hollow microspheric particulates was prepared using the ingredients listed in Table I and according to the following procedure. Water and the Theological thickener were added to a mixer having a Cowles blade and mixed at slow speed at about 4000 ft./min. for 25 minutes. Wetting agent, dispersing agent, and approximately 25% of the foam-control agent were added and then mixed for 5 minutes. Next, XPD2600 acrylic latex was added to the mixer and the mixture was mixed at slow speed for 5 minutes. The remainder of the foam-control agent and the hollow microsphere particulates made of polyvinylidene chloride (PVDC) were slowly sifted into the mixture. The mixing speed was slightly increased to about 4800 ft/min for 5 to 10 minutes, and the temperature was maintained at less than 90DF. This procedure yielded a high solids surface coating having 71.35% NV/volume.

TABLE I

| Ingredient | Generic Composition | Commercial Name | Weight % |
|---|---|---|---|
| Tap Water | N/A | N/A | 22.3 |
| Suspending Agent | Synthetic Colloidal Clay | Laponite RD | 0.46 |
| Wetting Agent | Modified Nonylphenoxy Polypropanol | Igepal CTA639/W | 0.10 |
| Defoamer | Anionic Blend of Mineral Oil and Silica | Drewplus L-475 | 0.23 |
| Dispersant | Ammonium Salt of Acrylic Acid Copolymer | BYK 156 | 0.21 |
| Latex (80.4% solids/Wt.) | Acrylic Copolymer Emulsion | XPD 2600 | 66.7 |
| Hollow Microspheres | Polyvinylidene Chloride Microspheres | Dualite M6001 AE | 10.0 |

The 71.35% NV/volume high solids surface coating so obtained was applied to a surface at a rate of approximately 33 wet mils thickness. The coating achieved rain-off resistance within 4 hours at 25° C. and 50% relative humidity and resulted in a dried coating having 24 dry mils thickness.

EXAMPLE 2 (Comparative)

A conventional water-borne coating having about 50% NV/volume and about 47% PVC was applied to a non-porous substrate at a rate of about 1.5 gal./square or approximately 24 wet mils thickness. The coating was wet after 8 hours but within 24 hours the coating dried to about 12 dry mils thickness at 100° C. and 80% relative humidity.

Although the high-solids coating of Example 1 was applied at more than twice the resulting dried thickness of conventional coatings, the high-solids coating was observed to have developed rain-off resistance after 8 hours at these conditions, whereas the conventional coating was washed off completely under these same conditions.

MICROSHPERE TYPE AND CONCENTRATION

EXAMPLES 3–17

The surface coatings of Examples 3–17, each example containing one of three different types of hollow microsphere particulates, were evaluated for elongation and tensile strength. In addition, these properties were measured at various concentrations of the microspheres. The coatings were screened for elastomeric performance. In roof coating applications, for example, a minimum elongation of 200% is required.

Fifteen coatings were made according to the procedure used in Example 1, except that the volume of hollow microsphere particulates and the volume of latex dispersion were both varied as set forth in Table II below while the concentration of all other components were held constant. Each of the coatings was formulated at a constant solids level of 71.35% NV/volume. Glass, ceramic and polyvinylidene hollow microsphere particulates were added such that the pigment volume concentration (PVC) of each coating, was set at 40%, 45%, 50%, 55% and 60% for coatings containing each of the three types of microspheres.

In Examples 3–7, water-borne surface coatings were prepared in five different volume concentrations of polyvinylidene chloride (PVDC) hollow microspheres. In Examples 8–12, water-borne surface coatings were prepared in five different volume concentrations of glass hollow microspheres. In Examples 13–17 water-borne surface coatings were prepared in five different volume concentrations of ceramic hollow microspheres. Each coating was applied to a non-porous release paper substrate at about 80 to about 85 wet mils thickness, and once the coating was dried, the elongation and tensile strength were measured according to ASTM method D2370. The measurements are set forth in Table II below.

TABLE II

| Example | Hollow Microspheres | Vol % Microspheres gal/100 gal | Vol % Latex | VNV (%) | PVC (%) | Elongation (%) | Tensile Strength (psi) |
|---|---|---|---|---|---|---|---|
| 3 | PVDC | 28.54 | 42.81 | 71.35 | 40 | 650 | 27 |
| 4 | PVDC | 32.11 | 39.24 | 71.35 | 45 | 425 | 39 |
| 5 | PVDC | 35.68 | 35.68 | 71.35 | 50 | 350 | 37 |
| 6 | PVDC | 39.24 | 32.11 | 71.35 | 55 | 240 | 39 |
| 7 | PVDC | 42.81 | 28.54 | 71.35 | 60 | 180 | 46 |
| 8 | Glass | 28.54 | 42.81 | 71.35 | 40 | 255 | 68 |
| 9 | Glass | 32.11 | 39.24 | 71.35 | 45 | 200 | 80 |
| 10 | Glass | 35.675 | 35.675 | 71.35 | 50 | 150 | 78 |
| 11 | Glass | 39.24 | 32.11 | 71.35 | 55 | 130 | 82 |
| 12 | Glass | 42.81 | 28.54 | 71.35 | 60 | 95 | 84 |
| 13 | Ceramic | 28.54 | 42.81 | 71.35 | 40 | 595 | 39 |

TABLE II-continued

| Example | Hollow Microspheres | Vol % Microspheres gal/100 gal | Vol % Latex | VNV (%) | PVC (%) | Elongation (%) | Tensile Strength (psi) |
|---|---|---|---|---|---|---|---|
| 14 | Ceramic | 32.11 | 39.24 | 71.35 | 45 | 325 | 37 |
| 15 | Ceramic | 35.675 | 35.675 | 71.35 | 50 | 375 | 33 |
| 16 | Ceramic | 39.24 | 32.11 | 71.35 | 55 | 310 | 37 |
| 17 | Ceramic | 42.81 | 28.54 | 71.35 | 60 | 200 | 30 |

The above examples show that the type and level of microsphere can be used to regulate the tensile and elongation properties of coating to suit a particular application. The type and level of microsphere was also found, qualitatively, to affect the coating hardness and abrasion resistance.

WATER RESISTANCE

EXAMPLES 18–21

High solids surface coatings that have elastomeric properties are desirable. However, initial evaluations of the high solids surface coating disclosed in Example 1 indicated that inherent water resistance was not satisfactory to withstand severe moisture conditions. For water-borne coatings that are exposed to severe moisture conditions, for example roof coatings, it is common practice to attempt to enhance water resistant properties by adding chemicals that are reactive with the water sensitive components. In this instance an effort was made to achieve improved water resistance by adding ammonium zirconium carbonate (AZC) crosslinker to acrylic latex and evaluating the effect of AZC concentration. Three samples were prepared by adding predetermined amounts of 20% NV/weight AZC solution (Bacote 20) to a high-solids (80% NV/volume acrylic latex dispersion (XPD 2600) under air mixer agitation. Three samples were produced with AZC crosslinker concentrations of about 2.5, 5 and 10 parts AZC per 100 parts of polymer (resin) solids (PHR) on a weight basis.

The three samples and an untreated sample of XPD2600 were tested using the following procedure:
Clean glass plates were coated at a thickness of approximately 2.8 wet mils using a #40 wire wound rod. After the coating was dried for one week at ambient conditions (approximately 70° F.), the glass panels were immersed in 70° F. water. The glass panels were removed momentarily at five different time intervals (2 hours, 8 hours, 1 week, 2 weeks and 3 weeks) to record observations. The degree of blushing and the quality of adhesion to the glass substrate, based on a subjective thumbnail adhesion test, were recorded as set forth in Table III below.

The data shows that AZC crosslinker significantly improved the water resistance and adhesion characteristics of acrylic latex. Also, the coatings containing 5% and 10% solids by weight AZC did not show added performance advantages over a coating conntaining 2.5% by weight AZC.

FIELD TEST ON ROOF

EXAMPLE 22 and Comparative EXAMPLE 23

A high solids surface coating was formulated and tested on an exterior roof. An opacifier and flame-retardant were added to suit the performance requirements of a roof coating. The surface coating was prepared using the ingredients listed in Table IV, and according to the following procedure:

Water and suspending agent were added to a mixer having a Cowles blade and mixed at slow speed of about 4000 ft/min for 25 minutes. The wetting agent, dispersing agent, fungicide and approximately 25 percent of the foam-control agent were added and then mixed at slow speed for 5 minutes. Next, cellulose fiber, titanium dioxide and zinc oxide were added and dispersed at high speed for 10 minutes. The temperature was controlled so as not to exceed 90° F. The measured amount of water was used as needed to wash the sides of the tank. This mixture was then transferred to a larger stainless steel tank fitted with a Cowles disperser and a Bowers P2 blade.

Next, the XPD2600 acrylic latex was added under Cowles agitation and mixed at slow speed of about 4000 ft/min for 5 minutes. The AZC crosslinker was then added slowly over a 10 to 15-minute time interval while mixing at slow speed. The mixing continued at slow speeds while the remainder of the foam-control agent and all of the polymeric (PVDC) microspheres were slowly sifted so that the microspheres were homogeneously dispersed throughout the mixture. The temperature of the mixture was maintained at less than 90° F. Finally, flame retardant, propylene glycol and the preservative solution were added and mixed at slow speed for 5 to 10 minutes. The result was a liquid surface coating having 71.35% VNV.

TABLE III

| Example | AZC Concentration (PHR) | Blushing (2 hrs.) | Thumbnail Adhesion (2 hrs.) | Blushing (8 hrs.) | Thumbnail Adhesion (8 hrs.) | Blushing (1 week) | Thumbnail Adhesion (1 week) | Blushing (2 weeks) | Thumbnail Adhesion (2 weeks) | Blushing (3 weeks) | Thumbnail Adhesion (3 weeks) |
|---|---|---|---|---|---|---|---|---|---|---|---|
| 18 | 0 | Severe | Poor | Severe | Very Poor | Severe | Very Poor | Severe | Good | Severe | Extremely Poor |
| 19 | 2.5 | None | Excellent | Slight | Excellent | Moderate | Very Good | Severe | Good | Severe | Fair |
| 20 | 5 | None | Excellent | Moderate | Excellent | Severe | Very Good | Severe | Good | Severe | Fair |
| 21 | 10 | None | Excellent | Moderate | Excellent | Severe | Very Good | Severe | Good | Severe | Fair |

TABLE IV

| Ingredient | Generic Composition | Commercial Name | Volume % | Weight % |
| --- | --- | --- | --- | --- |
| Tap Water | H2O | N/A | 14.05 | 17.8 |
| Suspending Agent | Synthetic Colloidal Clay | Laponite Rd | 0.26 | 0.43 |
| Wetting Agent | Modified Nonylphenoxy Polypropanol | Igepal CTA-639 | 0.23 | 0.31 |
| Dispersant | Ammonium Salt of Acrylic Acid Copolymer | Byk 156 | 0.20 | 0.31 |
| Defoamer | Anionic Blend of Mineral Oils and Silica Deriv. | Drewplus L-475 | 1.05 | 1.25 |
| Fungicide | Chlorothalonil Dispersion | Nuocide 404-D | 0.58 | 0.94 |
| Opacifier | Titanium Dioxide | TiPure R-902 | 0.75 | 3.91 |
| Ionic crosslinker | Zinc Oxide | Kadox 930 | 0.43 | 3.13 |
| Latex Dispersion | Acrylic Polymer Latex | XPD 2600 | 33.8 | 47.18 |
| Endcapping Crosslinker | Ammonium Zirconium Carbonate | Bacote 20 | 1.0 | 1.79 |
| Hollow Microspheres | Polyvinylidene Chloride | Dualite M6001 AE | 36.12 | 5.65 |
| Flame Retardant | Vinyl Acrylic Copolymer Latex containing Chlorine | Haloflex 563 | 11.32 | 16.99 |
| Preservative | Bicyclic Oxazolidine Solution | Nuosept 95 | 0.21 | 0.31 |

The high-solids surface coating of Table IV was applied to a barrel-shaped roof under sunny weather conditions of approximately 74° F. and 50% relative humidity. The substrate was a metal barrel roof that had been covered with a modified bitumen (MB) base sheet previously installed. The base sheet had been restored with a resin-modified asphalt emulsion coating six months prior to the field tests. (The resin-modified asphalt is the first coat of the conventional two-part roof coating system).

The testing was conducted by applying a layer of primer coating over the entire roof, then applying the conventional two-coat, topcoat over a portion of the roof, and applying a the high-solids coating of this invention over a separate portion of the roof. All materials of the field test were applied to the roof using airless spray equipment having a 0.035 inch spray tip and were pumped with an 11:1 ratio pump. The primer coating, a dilute solution of resin-modified asphalt, was applied to the entire roof and was dried in approximately 30 to 45 minutes. Two coats of conventional water-borne coating, Polarcoat FR were sprayed as a control on approximately 50 squares of the roof. The first coat was applied by airless spray to 50 squares of roofing at a rate of 1–1.5 gal/square (16–24 wet mils) and dried for 24 hours. The second coat was applied at the same rate and dried in approximately two hours. After four hours, adhesion of this conventional coating was checked and the material could be peeled off.

Next, a single coat of high solids surface coating was applied by airless spray to the barrel roof at a rate of 3–6 gallons per square (48–96 wet mils). In some areas where the material was applied at a rate exceeding 5 gallons per square, the material was found to sag. The coating dried in one hour at 3 gallons per square coverage. After three hours, the material was checked for adhesion and was found to adhere very well. The results of the field test are summarized in Table V below.

TABLE V

| Example | Coverage Gal./Sq. | Wet Mils | Dry Mils | Sag | Dry Time 50% RH/74° F. | Color | Adhesion |
| --- | --- | --- | --- | --- | --- | --- | --- |
| Example 22 | 3–6 | 48–96 | 38.4–76.8 | Yes | 2 hrs. | White | Excellent |
| *Comparative Example 23 | 1–1.5 | 16–24 | 6–12 | No | 4 hrs. | White | Poor |

*Comparative Example 23 is a conventional coating commercially available as Polarcoat FR from Tremco Incorporated. Polarcoat FR is a 50% NV/volume reflective topcoat having about 47% pvc concentration.

The high solids surface coating of this invention was applied at a thicker coverage than the conventional roof coating, yet dried significantly faster.

FLAME RETARDANT

EXAMPLES 24, 25, 26 and 27

The effect of antimony trioxide as a flame retardant in the high solids surface coating was evaluated. Samples of the high solids surface coating containing antimony trioxide were also tested for water sensitivity. Three coatings were prepared adding 65% NV/wt aqueous dispersion of antimony trioxide to the surface coating that was prepared according to the procedure of Example 22. A pH stabilizer was also added to prevent viscosity stability problems created by the antimony trioxide. The effect of the antimony trioxide dispersion and the amine stabilizer on the water resistance of this coating was routinely checked using the coating formulation listed in Table IV as the control system.

The antimony trioxide dispersion was added to the surface coating such that the volume of antimony trioxide solids was present at levels of 15%, 20% and 25% based on the total of latex polymer solids and antimony trioxide solids by volume. The antimony trioxide dispersion was added such that the antimony trioxide dispersion replaced the acrylic latex to achieve the targeted levels of antimony trioxide solids. A high solids surface coating containing 9.65% by volume (21.3% wt.) antimony trioxide was found to have the best fire resistance, and the ingredients are listed in Table VI below.

TABLE VI

| Ingredient | Generic Composition | Commercial Name | Volume % | Weight % |
| --- | --- | --- | --- | --- |
| Tap Water | H2O | N/A | 17.15 | 20.55 |
| Suspending Agent | Synthetic Colloidal Clay | Laponite Rd | .24 | 0.40 |
| Wetting Agent | Modified Nonylphenoxy Polypropanol | Igepal CTA-639 | .23 | 0.29 |
| Dispersant | Ammonium Salt of Acrylic Acid Copolymer | Byk 156 | .20 | 0.29 |
| Defoamer | Anionic Blend of Mineral Oils and Silica Derivatives | Drewplus L-475 | 1.05 | 1.15 |
| Fungicide | Chlorothalonil Dispersion | Nuocide 404-D | .58 | 0.86 |
| Opacifier | Titanium Dioxide | TiPure R-902 | .75 | 3.6 |
| Ionic Crosslinker | Zinc Oxide | Kadox 930 | .43 | 2.88 |
| Latex Dispersion | Acrylic Polymer Latex | XPD2600 | 31.82 | 40.89 |
| End-capping Crosslinker | Ammonium Zirconium Carbonate | Bacote 20 | 1.00 | 1.65 |
| Hollow Microspheres | Polyvinylidene Chloride | Dualite M6001 AE | 36.12 | 5.2 |
| Flame Retardant | Antimony Trioxide | Octoguard FR-10 | 9.65 | 21.3 |
| PH Stabilizer | 2-Amino 2-Methyl 1-Propanol | AMP 95 | .57 | 0.65 |
| Preservative | Bicyclic Oxazolidine Solution | Nuosept 95 | .21 | 0.29 |

The test method used to evaluate the water resistance of the high solids surface coatings containing the various levels of antimony trioxide is as follows: The coatings were applied to glass substrates with a BYK-Gardner film casting knife that delivered 80 wet mils of coating to the glass plates. The coatings were left to dry at ambient conditions (about 25° C., 50%RH) for one week, and the effect of antimony trioxide levels on the water resistance and wet adhesion of approximately 57 dried mils of coating was determined by checking thumbnail adhesion at various time intervals. The coated glass panels were immersed into water and the changes in their appearance as well as the thumbnail adhesion was observed. The results are shown in Table VII.

TABLE VII

| Example | Antimony Trioxide Concentration | Thumbnail Adhesion (2 hrs.) | Blistering (2 hrs.) | Thumbnail Adhesion (8 hrs.) | Blistering (8 hrs.) | Thumbnail Adhesion (1 week) | Blistering (1 week) | Thumbnail Adhesion (2 weeks) | Blistering (2 weeks) | Thumbnail Adhesion (3 weeks) | Blistering (3 weeks) |
| --- | --- | --- | --- | --- | --- | --- | --- | --- | --- | --- | --- |
| 24 | 0 | Very Good | Slight | Good | Moderate | Poor | Moderate | Poor | Moderate | Poor | Moderate |
| 25 | 15 | Very Good | Slight | Very Good | Slight | Good | Slight | Good | Slight | Fair | Slight |
| 26 | 20 | Excellent | None | Excellent | None | Excellent | None | Excellent | None | Excellent | None |
| 27 | 25 | Excellent | None | Excellent | None | Excellent | None | Excellent | None | Excellent | None |

SAG RESISTANCE

EXAMPLES 28. 29, 30. 31 and 32

A high solids surface coating was formulated to test the sag resistance of the coating with the addition of fibers. The coating was prepared according to the procedure of Example 22, and the weight and volume percent of all ingredients prior to adding the fiber is listed in TABLE VIII below.

TABLE VIII

| Ingredient | Generic Composition | Commercial Name | Volume % | Weight % |
| --- | --- | --- | --- | --- |
| Tap Water | N/A | N/A | 13.89 | 17.21 |
| Suspending Agent | Synthetic Colloidal Clay | Laponite RDS | 0.14 | 0.46 |
| Wetting Agent | Modified Nonylphenoxy Polypropanol | Igepal CTA-639 | 0.56 | 0.75 |
| Dispersant | Ammonium Salt of Acrylic Acid Copolymer | Byk 156 | 0.50 | 0.75 |
| Defoamer | Anionic Blend of Mineral Oils and Silica Derivatives | Drewplus L-475 | 1.01 | 1.17 |
| Fungicide | Chlorothalonil Dispersion | Nuocide 404-D | 0.56 | 0.88 |
| Opacifier | Titanium Dioxide | TiPure R-902 | 1.28 | 8.50 |
| Ionic Crosslinker | Zinc Oxide | Kadox 930 | 0.21 | 1.46 |
| Latex Dispersion | Acrylic Polymer Latex | XPD2600 | 32.64 | 44.33 |
| End-capping Crosslinker | Ammonium Zirconium Carbonate | Bacote 20 | 0.86 | 1.50 |

TABLE VIII-continued

| Ingredient | Generic Composition | Commercial Name | Volume % | Weight % |
|---|---|---|---|---|
| Hollow Microspheres | Polyvinylidene Chloride | Dualite M6001 AE | 34.89 | 5.31 |
| Flame Retardant | Vinyl Acrylic Copolymer | Haloflex 563 | 10.93 | 15.96 |
| Preservative | Bicyclic Oxazolidine Solution | Nuosept 95 | 0.2 | 0.29 |
| Freeze/Thaw Stabilizing Agent | Propylene Glycol | N/A | 2.33 | 3.05 |

The amount of fiber added to the high solids surface coating of Table VIII is listed in Table IX. The sag resistance was tested using a Leneta Sag Bar according too ASTM D4400 method. The results are listed in Table IX.

TABLE IX

| Example | Interfibe (Wt. %) | Minifibers (Wt. %) | Initial Viscosity (KU) | Reading at Initial Sag (Leneta) | Next Day Sag (Leneta) |
|---|---|---|---|---|---|
| 28 | 0.38 | 0 | 68 | 16 mils | n/a |
| 29 | 0.38 plus 1.63% by total wt. Extra | 0 | 95 | 20 mils | n/a |
| 30 | 0.38 plus 2.16% by total wt. Extra | 0 | 103 | 25 mils | n/a |
| 31 | 0.38 plus 2.83% by total wt. Extra | 0 | 119 | 40 mils | n/a |
| 32 | 0.38 | 0.99% by total wt. Extra | 102 | 30 mils | n/a |

WASH-OFF RESISTANCE

EXAMPLES 33, 34, 35 and Comparative Example 36

The wash-off resistance of three high solids surface coatings was compared to conventional water-borne top coat. The formulations of the high solids surface coatings of Examples 33 and 35 are listed in Tables IV and Table VIII, respectively. The formulation of the high solids surface coating of Example 34 is listed in Table X below.

TABLE X

| Ingredient | Generic Composition | Commercial Name | Volume % | Weight % |
|---|---|---|---|---|
| Tap Water | N/A | N/A | 10.63 | 17.21 |
| Suspending Agent | Synthetic Colloidal Clay | Laponite RDS | 0.26 | 0.46 |
| Wetting Agent | Modified Nonylphenoxy Polypropanol | Igepal CTA-639 | 0.23 | 0.75 |
| Dispersant | Ammonium Salt of Acrylic Acid Copolymer | Byk 156 | 0.20 | 0.75 |
| Defoamer | Anionic Blend of Mineral Oils and Silica Derivatives | Drewplus L-475 | 1.05 | 1.17 |
| Fungicide | Chlorothalonil Dispersion | Nuocide 404-D | 0.58 | 0.88 |
| Opacifier | Titanium Dioxide | TiPure R-902 | 0.75 | 8.50 |
| Ionic Crosslinker | Zinc Oxide | Kadox 930 | 0.43 | 1.46 |
| Latex Dispersion | Acrylic Polymer Latex | XPD2600 | 33.80 | 44.33 |
| End-capping Crosslinker | Ammonium Zirconium Carbonate | Bacote 20 | 1.0 | 1.50 |
| Hollow Microspheres | Polyvinylidene Chloride | Dualite M6001 AE | 36.12 | 5.31 |
| Flame Retardant | Vinyl Acrylic Copolymer Latex containing Chlorine | Haloflex 563 | 11.32 | 15.96 |
| Preservative | Bicyclic Oxazolidine Solution | Nuosept 95 | 0.21 | 0.29 |
| Freeze/Thaw Stabilizing Agent | Propylene Glycol | N/A | 2.32 | 3.05 |
| Fiber | Cellulose Fiber | Inerfibe 5FT | 0.55 | 0.78 |

The high solids surface coatings of Examples 33, 34, and 35 were applied at a rate of 5 gals./square which resulted in a dried film of 56 dry mils thick. The conventional water-borne coating of Example 36 was applied at a rate of 1.5 gals./square and resulted in a dried film of 12 mils thick. All samples were tested for rain-off resistance on a pass/fail basis. The results are listed in Table XI.

TABLE XI

| EXAMPLE | Dry time before testing (@ Approx. 50° F. (10° C.); 80% R. H. | | | | | | |
|---|---|---|---|---|---|---|---|
| | 2 hour | 3 hour | 4 hour | 5 hour | 6 hour | 8 hour | 24 hour |
| Example 33 | failure | failure | pass | pass | pass | Pass | pass |
| Example 34 | failure | failure | failure | failure | pass | pass | pass |
| Example 35 | failure | failure | failure | failure | failure | pass | pass |
| *Comparative Example 36 | failure | failure | failure | failure | failure | failure | pass |

*Comparative Example 36 is a conventional coating commercially available as Polarcoat FR from Tremco Incorporated. Polarcoat FR is a 50 NV/volume reflective top coat having 47% non-filmforming solids concentration.

The results show that all of the high solids surface coating formulations achieved rain-off resistance in 8 hours or less and in a shorter time than the conventional top coat applied at a lower coverage rate.

STRENGTH IMPROVEMENTS

EXAMPLES 37, 38, 39, 40, 41 and COMPARATIVE EXAMPLE 42

A high strength coatings comprising varying levels of zinc oxide crosslinker were prepared and after the coatings were dried, the films were tested for tensile strength, tensile strength at 100% modulus, elongation at break, and tear strength according to ASTM methods. The strength properties of a dried film of acrylate latex polymer, XPD2600 were also measured. The results are listed in Table XII.

TABLE XII

| Examples | Wt. % ZnO (relative to wet polymer) | Tensile Strength at 100% Modulus (psi) | Tensile Strength (psi) | Elongation at break (%) | Tear Strength (psi) |
|---|---|---|---|---|---|
| 37 | 2 | 61 | 198 | 362 | 53 |
| 38 | 4 | 80 | 228 | 326 | 51 |
| 39 | 6 | 73 | 219 | 353 | 52 |
| 40 | 8 | 71 | 185 | 312 | 52 |
| 41 | 10 | 78 | 207 | 327 | 53 |
| Comparative Example 42 | 0 | 12 | 77 | >110% | 23 |

The results show that all of the coatings containing zinc oxide crosslinker have significantly improved tensile strength and tensile strength at 100% modulus. An addition of only 2% by weight of zinc oxide provides optimum benefit in an acrylic latex dispersion of about 80% NV/vol.

Other modifications and variations of the present invention are possible in light of the above teachings. For example, other ingredients, such as non-film-forming ingredients, may be substituted for or added to those listed herein. It is to be understood, however, that changes may be made in the particular embodiments described above which are within the full-intended scope of the invention as defined in the appended claims.

What is claimed is:

1. A method of sealing which comprises the following steps:
  a. providing a high solids water-borne surface coating, the surface coating comprises from about 65% to about 90% by volume solids and the solids comprises from about 26% to about 76% by volume latex polymer and from about 26% to about 76% by volume hollow particulates and,
  b. applying the high solids water-borne surface coating on a substrate,
  the coating is characterized in that when applied in a single coat yields a dried coating that is from about 35 mils to about 70 mils thick.

2. The method of claim 1 wherein the surface coating has a PVC greater than 40% and an elongation of at least about 200%; and
  wherein said method further includes allowing the coating to dry at about 10IC and about 80% relative humidity to achieve rain resistance in about eight hours or less.

3. The method of claim 1 wherein the high solids water-borne surface coating is applied to a roof.

4. A water-resistant and ultraviolet resistant construction component comprising:
  a substrate,
  a dried high solids surface coating disposed on the substrate,
  wherein said coating prior to being dried comprises from about 65% to about 90% total solids, wherein said solids comprise from about 26% to about 76% by volume latex polymer and from about 26% to about 76% by volume hollow particulates, and water, and
  wherein said surface coating has a PVC greater than 40%.

5. A high solids water-borne surface coating composition comprising:
  a. from about 26 to 76 vol. % latex polymer,
  b. from about 26 to 76 vol. % hollow particulates, and
  c. water,
  the coating comprises from about 65 to about 90 vol. % total solids such that the coating composition is capable of forming a dried coating having an elongation of at least about 200% and a dried thickness of about 35 to 70 mils when a applied to a substrate in a single coat.

6. The high-solids water-bome coating composition of claim 5, wherein the coating composition has a viscosity of about 95 to 115 KU at 25° C.

7. The high-solids water-borne coating composition of claim 5, wherein the coating has a PVC greater than 50%.

8. A high solids water-borne roofing composition comprising from about 65 to about 90 vol. % total solids based on the total volume of the composition, and wherein the solids include from about 26 to 76 vol. % latex polymer based on the total volume of the composition, from about 26 to 76 vol. % hollow particulates based on the total volume of the composition, the hollow particulates are microspheres having a diameter of up to 200 microns, an opacifier, and a fire retardant, the roofing composition flirther containing sufficient water so that the composition has a viscosity of 95 to 115 KU at 25° C. and is capable of forming a dried coating having an elongation of at least about 200% and a thickness of about 35 to 70 mils when a applied to a substrate in a single coat.

9. The roofing composition of claim 8, wherein the coating has a PVC from about 40 to about 60%.

10. The roofing composition of claim 9, wherein the composition comprises about 65 to about 80 vol. % total solids.

11. The roofing composition of claim 10, wherein the composition comprises about 65 to about 75 vol. % total solids.

12. The roofing composition of claim 11, wherein the hollow particulates comprise polyvinylidene chloride.

13. The roofing composition of claim 9, wherein the composition comprises about 65 to about 80 vol. % total solids.

14. The roofing composition of claim 13, wherein the composition comprises about 65 to about 75 vol. % total solids.

15. The roofing composition of claim 14, wherein the hollow particulates comprise polyvinylidene chloride.

16. The roofing composition of claim 15, wherein the composition further comprises:

about 0.03 vol. % to about 10 vol. % suspending agent, about 0.1 vol. % to about 10 vol. % end-capping crosslinker, about 0.1 vol.% to about 2 vol.% ionic crosslinker, fiber, a fungicide, and, a preservative.

17. A high-solids water-borne surface coating composition comprising:

water, from about 65 to about 90 vol.% total solids wherein the solids of the coating comprise:

from about 26 to 76 vol. % latex polymer and from about 26 to 76 vol. % hollow particulates, and wherein the coating composition is capable of forming a dried coating having a thickness of about 35 to about 70 mils when applied to a substrate in a single coat.

18. The high solids water-borne surface coating of claim 17 further comprising about 0.03% to about 10% suspending agent by volume.

19. The high solids water-borne surface coating of claim 17 further comprising about 0.1% to about 10% end-capping crosslinker by volume.

20. The high solids water-borne surface coating of claim 17 further comprising about 0.1% to about 2% ionic crosslinker by volume.

21. The high solids surface coating according to claim 17, wherein said latex polymer is selected from the group consisting of: acrylate, vinyl acetate, urethane, vinyl chloride co-polymer, vinylidene chloride co-polymer, polyvinyl acetate—ethylene copolymer and combinations thereof.

22. The high solids water-borne surface coating of claim 17 wherein said latex polymer comprises butylacrylate and ethylacrylate.

23. The high solids surface coating of claim 17 wherein said latex polymer has a Tg of 0° C. or less.

24. The high solids water-borne surface coating according to claim 17 wherein said latex polymer has a particle-size distribution with two or more modes, wherein one mode has particles with diameters that range from about 0.05 to 4 microns and another mode has particles with diameters that range from above 4 microns to about 100 microns.

25. The high solids water-borne surface coating according to claim 17 wherein said hollow particulates are microspheres and have diameters of about 1 to 200 microns.

26. The water borne surface coating according to claim 25 wherein said hollow particulates comprise polyvinylidene chloride.

27. The high solids water-borne surface coating according to claim 17 wherein said latex polymer has a particle-size distribution with at least two modes, wherein one of said modes contains polymer particles having diameters that range from about 0.05 to about 4 microns and a second of said modes contains polymer particles having diameters that range from above 4 to about 100 microns, and wherein said hollow particulates are microspheres.

28. The high solids water-borne surface coating of claim 12 wherein said high solids surface coating further comprises by volume about 0.03% to about 10% suspending agent, about 0.1% to about 10% end-capping crosslinker, and about 0.1% to about 2% ionic crosslinker.

29. The high solids surface coating of claim 28 wherein said suspending agent is colloidal clay thickener, said end-capping crosslinker is ammonium zirconium carbonate, and said ionic crosslinker is zinc oxide.

30. The high solids water-borne surface coating of claim 17 wherein said coating further includes flame retardant, opacifier, fiber, fungicide and preservative.

31. The high solids water-borne surface coating of claim 17 wherein the coating comprises a latex dispersion that is greater than 70% solids by weight.

32. The water-borne composition of claim 17, wherein the coating has a PVC of from about 40% to about 60%.

33. The water-borne composition of claim 17, wherein the coating has a PVC greater than 50%.

34. The water-borne composition of claim 17, wherein the composition contains from about 68 to 72 vol. % solids.

35. The water-borne composition of claim 17, wherein the composition has a viscosity of 95 to 115 KU at 25° C.

36. The water-borne composition of claim 32, wherein the composition has a viscosity of 95 to 115 KU at 25° C.

37. The water-borne composition of claim 17, wherein the composition comprises about 65 to about 80 vol.% total solids.

38. The composition of claim 37, wherein the composition comprises about 65 to 75 vol. % total solids.

39. The water-borne composition of claim 38, wherein the coating has a PVC from about 40 to about 60%.

40. The composition of claim 39, wherein the composition has a viscosity of 95 to 115 KU at 25° C.

41. The water-borne composition of claim 40, wherein the hollow particulates are microspheres that have diameters of about 20 to about 60 microns.

42. The water-borne composition of claim 40, wherein the hollow particulates are formed from polyvinylidene chloride.

43. The water-borne composition of claim 37, wherein the coating has a PVC from about 40 to about 60%.

44. The composition of claim 43, wherein the composition has a viscosity of 95 to 115 KU at 25° C.

45. The water-borne composition of claim 44, wherein the hollow particulates have diameters of about 20 to about 60 microns.

46. The water-borne composition of claim 44, wherein the hollow particulates are formed from polyvinylidene chloride.

* * * * *